United States Patent [19]

Takahashi et al.

[11] Patent Number: 5,710,872
[45] Date of Patent: Jan. 20, 1998

[54] COLOR IMAGE RECORDING DEVICE, SYSTEM, AND METHOD

[75] Inventors: Akihiko Takahashi; Naoaki Yorita, both of Kanagawa-ken, Japan

[73] Assignee: Nikon Corporation, Tokyo, Japan

[21] Appl. No.: 620,178

[22] Filed: Mar. 22, 1996

[30] Foreign Application Priority Data

Mar. 23, 1995 [JP] Japan .................................. 7-063251
Jun. 15, 1995 [JP] Japan .................................. 7-174245

[51] Int. Cl.[6] .................................................... H04N 1/60
[52] U.S. Cl. ........................... 395/109; 358/518; 358/523
[58] Field of Search ..................................... 395/109, 131; 358/518, 520, 519, 521, 523; 382/167

[56] References Cited

U.S. PATENT DOCUMENTS

| | | | |
|---|---|---|---|
| 4,929,978 | 5/1990 | Kanamori et al. | 358/520 |
| 4,985,853 | 1/1991 | Taylor et al. | 395/131 |
| 5,299,291 | 3/1994 | Ruetz | 395/109 |
| 5,416,890 | 5/1995 | Beretta | 395/131 |
| 5,448,380 | 9/1995 | Park | 358/520 |
| 5,500,921 | 3/1996 | Ruetz | 395/109 |
| 5,502,580 | 3/1996 | Yoda et al. | 358/518 |
| 5,600,764 | 2/1997 | Kakutani | 395/131 |

*Primary Examiner*—Scott A. Rogers
*Attorney, Agent, or Firm*—Oliff & Berridge

[57] ABSTRACT

A color image recording device that prevents extreme changes in color at the boundary of the selected color when the hue, value, and chroma are color adjusted selectively but not as a whole. In addition, creating color data for printing does not require large processing time even when a large image is printed. The color image recording device forms color data for printing by adjusting the color of an RGB color decomposition signal of an input device such as a color scanner, or RGB image data from a computer. The color image recording device prints after partially and selectively adjusting color. Furthermore, when converting the RGB data to data unique to the color image printing device, the color image recording device conducts coordinate conversion in the uniform color space and computes a matrix coefficient using the set values of each correction range. Each of the correction amounts of the hue, value, and chroma are set by the operator and the printing characteristic data. The data from the print characteristic data recording device may be weighted based on the setting value.

47 Claims, 15 Drawing Sheets

[MANUAL OPERATION]

●20  PORTRAIT
     (SKIN COLOR EMPHASIZED)

○21  SCENERY
     (GREEN, BLUE EMPHASIZED)

○CG  GRADATION IN CHROMA
     DIRECTION EMPHASIZED

COLOR IMAGE RECORDING DEVICE, SYSTEM, AND METHOD

BACKGROUND OF THE INVENTION

1. Field of the Invention

The present invention relates to a color image recording device and system that forms color data for use in color printing on the basis of RGB signals. The image recording device executes color correction using a matrix coefficient and is capable of more accurately rendering colors for which accurate rendering is required. The device can conduct adjustment and changes of a specific color selectively without converting all of the hue, value, and chroma of the printing image in a recording device that conducts color correction using a matrix coefficient.

2. Description of Related Art

Conventionally, in a color image recording device that conducts color correction using a matrix coefficient, when only a specific color adjustment is made without completely adjusting the hue, value, and chroma of a printing image, a process is used to determine whether the input data achieves the desired color adjustment. If the desired adjustment is not achieved, a method of adjusting the color correction amount of the specific color is used.

As shown in FIG. 15, when the printer operates based on the RGB signal from the computer and/or scanner to modify a specific color, printing is conducted by first converting the color of each pixel reliably to a coordinate value in a color space such as CIELAB, HVC (Hue value chroma), or HLS (Hue lightness saturation). The pixel data of the modified coordinate values return to the RGB signal after modification. The values are then converted into pixel data for Y (yellow), M (magenta) and C (cyan) for use by a printer using tables or the like. This YMC image data is output as color data to a printing device.

To improve upon this structure, it was necessary to create a new correction mechanism for input signals for color tone near the boundary. This mechanism is necessary to prevent a definite boundary between the target color tone to which a correction has been added and the color tone to which a correction has not been added.

To achieve this objective, the conventional example shown in FIG. 15 was improved, as shown in FIG. 16. In converting the data of specific coordinate values in the color space on the basis of the RGB signal, printing is conducted by conducting weighting to provide a difference in change amounts based on the range of the coordinate values. In modifying the color in this specific range, the selected range to which a modification is added is found by adding a slight modification conversion to all colors including those used to approximate this specified color. After the data in the selected range has been thus modified, the data is converted back to an RGB signal, is converted to YMC image data, and the color data is output to the printer.

Also in the prior art, as shown in FIG. 17, the signals input as RGB data (RGB image data or RGB color decomposition signals) are converted into L*a*b*, HVC (Hue value chroma), and HLS(Hue lightness saturation). In the converted color space, the optimum matrix coefficient is selected for each color region. A different matrix coefficient is used depending on the image data being input. Conversion of color space, color correction using the matrix coefficient, and data conversion are executed for each color region.

Several problems arise with the use of the aforementioned systems. In the system of FIG. 15, extreme changes exist in the color at the boundary of the targeted color. When a image is formed in which the color changes continuously, the appearance worsens. In addition, a color tone is determined for the image data which has been input, and color correction is accomplished accordingly. Consequently, the processing time becomes extremely large as the amount of image data becomes large.

In the system of FIG. 16 extreme changes in the color at the boundary of the targeted color are prevented, resulting in an improved appearance. However, with the color image recording device of the prior art described in FIG. 17, it was necessary to select a matrix coefficient for the color region corresponding to all the image data being input. Therefore, the processing time becomes too long when image data becomes large.

Additionally, the matrix coefficient selected may be optimum for each color region, and false contours may inconveniently be created at the boundary due to poor sustainment of color tone.

SUMMARY OF THE INVENTION

In consideration of the foregoing, it is an objective of the present invention to provide a color image recording device in which extreme changes and false contours are prevented in color at the boundary of the selected color when the hue, value, and chroma are color adjusted selectively, but not as a whole.

Additionally, it is an objective to provide a system in which creating color data for printing does not require a large processing time even when a large image is printed.

The present invention provides a color image recording device that forms color data for printing by adjusting the color of an RGB color decomposition signal of an input device such as a color scanner, or RGB image data from a computer. The color image recording device includes a printing characteristic data recording device that records the printing characteristics of a device that prints the color image. A color adjustment setting device determines the color adjustment by allowing the operator to select only the color region where there is uniform color space. A color adjustment data computation unit corrects the data value of the printing characteristic data recording device by setting the amount of adjustment to be made by the color adjustment setting device. A matrix coefficient computation unit computes a matrix in order to convert the RGB signal into data unique to the color image recording device using the results of the computations of the color adjustment data computation unit and the data from the printing characteristic data recording device. The color adjustment data computation unit conducts data conversion on the printing characteristic data in the uniform color space.

CIELAB or CIELUV is used as the uniform color space. One part of the printing characteristic data may be the XYZ tristimulus values or the Yxy values, and the rest of the printing characteristic data includes printing characteristic data unique to the color image recording device. Furthermore, the data unique to the color image recording device includes at least the three colors Y (yellow), M (magenta) and C (cyan), and may also include K (black). The colors are represented as digital values with a one-to-one correspondence to the gradations on four color print paper.

In addition, the color adjustment setting device independently sets the value and chroma in the range selected by the hue. The color adjustment data computation unit contains, for example, conversion units which convert the XYZ tristimulus values into uniform color space. The conversion process then converts each of these values in accordance with each of the correction parameters of hue, value, and chroma, and the range of the hue set by the operator. The process then converts each value from uniform color space to XYZ tristimulus values, and finally from the XYZ tristimulus values into monitor RGB signals. The functions which convert each of the values for each of the parameters of hue, value, and chroma and the range of the hue used in color adjustment may be set arbitrarily, and may include the functions noted below that when the data meets the following condition:

$$360° \geq H1 \geq H \geq H2 \geq 0° \quad (1)$$

(Here, H=arctan (b*/a*))
L* =V×L*,
α*=C×a*
β*=C×b*
A*=α*×cos (ΔH×π/180°)−β*×sin (ΔH×π/180°)
B*=α*×sin (ΔH×π/180°)+β*×cos (ΔH×π/180°)

Here, l* is the pre-conversion L* value, and L* is the post-conversion L* value;

a* is the pre-conversion a* value and A* is the post-conversion a* value; and b* is the pre-conversion b* value and B* is the post-conversion b* value.

H1 and H2 are the range of values of the selected hue.
ΔH is the hue adjustment value.
V is the value adjustment value.
C is the chroma adjustment value.

Furthermore, with the matrix coefficient computation unit, although the matrix coefficient is computed using the method of least squares, it is also possible to arbitrarily select any non-linear optimization algorithm.

Furthermore, these color image correction devices are also suitable for color recording devices of various formats, such as color thermal fusion transfer printers, color sublimation printers, color ink jet printers, and electronic photograph-type color printers. All of the color image correction devices may be integrated into the computer that forms the image data. Additionally, all or a portion of the color image correction devices may be integrated into the printer.

The color image recording device of the present invention has a matrix coefficient computation unit that can compute a matrix coefficient containing the correction amounts of hue, value, and chroma for selected color correction without across-the-board color correction. In addition, in the computation procedure, a color adjustment setting device inputs selective color correction data. Data conversion is conducted on the basis of uniform color spaces with the use of the color adjustment data computation unit only for printing characteristic data prepared beforehand for each correction value of the hue, value, and chroma.

Accordingly, even when the amount of image data that is printed is enormous, it is not necessary to perform each of the corrections for hue, value, and chroma in the selective color corrections for all of the image data. Therefore it possible to shorten the processing time.

In addition, the portion of the boundary of color tone not including the selected color tone changes smoothly according to the relationship expressed by a matrix coefficient used to convert the RGB signal to color data. Consequently, there are no extremely rapid changes in the color tone such as those seen in other selective color corrections. Further, it is possible to use a simple method in which processing of the boundary color is not necessary.

Furthermore, if the uniform color space is taken to be CIELAB or CIELUV, the conversion from the RGB signal to the color space and the conversion back to the RGB signal are conducted easily using international standards. The formation of the color data for printing can easily be accomplished if the XYZ tristimulus values or the Yxy values are used as one part of the printing characteristic data. The color data for printing are easily and rapidly formed if the gradations of the YMC and YMCK are taken to be digital values with a one-to-one correspondence as the data unique to color image recording devices. Furthermore, in the present invention, computation of the matrix is conducted with ease.

In addition, in an embodiment of the invention, setting of the conversion amount and designation of the specific color if a color adjustment setting device is used can be easily achieved. The color adjustment setting device can independently set the value and chroma of a range selected by the hue. The color adjustment data computation device, which converts the data to a uniform color space by means of a first color conversion process, subsequently performs modifications independently through the use of a second color conversion process. The color adjustment data computation device then converts this data into XYZ tristimulus values and converts the data back into an RGB signal again with a third color conversion process and a fourth color conversion process. The modification of the color from the RGB signal into the target color is thereby accomplished with ease. A specific data conversion can easily be accomplished with a computer and appropriate equation. The suitable matrix can be found rapidly if a matrix coefficient computation unit is used that finds a matrix coefficient using the method of least squares.

Furthermore, if the color image recording device is integrated into the computer which forms the image data, not only is this image data displayed clearly on the CRT, but can also be printed in color from the computer. If the entirety of the device is integrated into the printer, rapid color printing is possible through the use of the RGB signal. If a portion of the device is integrated into the printer, a small printer peripheral can also be provided.

In a further embodiment of the invention, the system includes a print characteristic data recording device to record print characteristics of the color image recording device, a color region selection device for selecting a color region, and a matrix coefficient algorithm unit for computing a matrix for converting the RGB data into data unique to the color image recording device using a setting value established by the color selection device and the print characteristic data recording device. The matrix coefficient algorithm unit converts the data using the data from the print characteristic data recording device that is weighted based on the setting value.

With the color recording device and a color recording system structured above, only one matrix coefficient for color correction to achieve more accurate color rendering is computed for the desired color region immediately before printing. Moreover, in the process of computing the matrix coefficient, the weighted coefficient is determined only for the color region relative to the print characteristic data prepared beforehand, and the subsequent computation is carried out using the same method as with computing the regular matrix coefficient. Hence, even if a large amount of image data is to be printed, it is not necessary to select the optimum matrix coefficient for the entire image data as in the prior art. This enables a reduction in processing time.

Moreover, in the boundary section of the selected color region, only one matrix coefficient rather than a plurality of matrix coefficients is used. Accordingly, drastic changes in color tone do not occur, enabling the use of a simple method which does not require additional processes for dealing with boundary color.

DETAILED DESCRIPTION OF PREFERRED EMBODIMENTS

Figure 1:
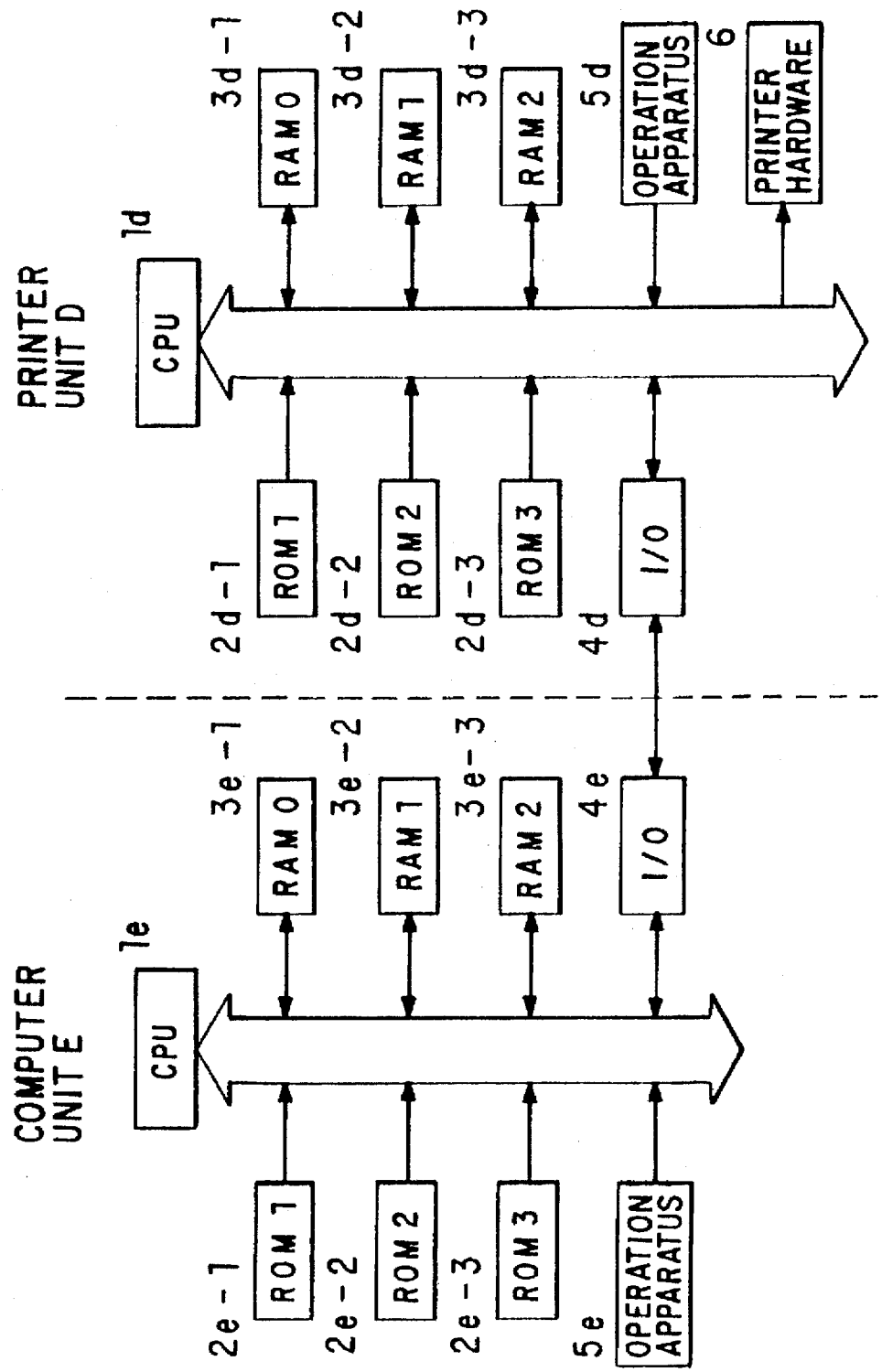
FIG. 1 is a block diagram showing the system of an embodiment of the invention

FIG. 1 is a block diagram showing the system composition of the present embodiment. This system is divided into a computer unit E and a printer unit D. Exchange of data between the computer unit and the printer unit is conducted via I/O 4e and I/O 4d.

CPU 1e is a circuit used to conduct computation processes and control each of the members of the computer unit. The CPU 1d is a circuit used to conduct computation processes and control each member of the printer unit.

Components and members of the computer unit and printer unit having the same name and serve the same function. Components and members with the same name may be contained in either one of the computer unit or the printer unit. Therefore, the description of the computer components below also applies to the printer components.

ROM1 is used to store printing characteristic data (c3 from FIG. 2) prior to processing. The data of all of the colors of the printing characteristic data are composed of a pair including the XYZ tristimulus value and the YMC internal data. ROM2 is used to store the programs of the color adjustment data computation process (c2 in FIG. 2) and the matrix computation process (c4 in FIG. 2). ROM3 is used to store the program that converts the RGB data to YMC internal data. The program that converts the RGB data to YMC internal data is disclosed by processes a2, a3, and a4 as shown in FIG. 3.

The operation apparatus 5e is a device that enables a user to input various settings. The operation apparatus 5e may include a keyboard, a mouse, or the like.

RAM0 stores the RGB color decomposition signal of the scanner or like component and the RGB image data of the computer.

RAM1 and RAM2 are operation regions for the programs executed by the CPU. RAM1 is an operation region for the processes the CPU executes corresponding to the programs in ROM1 and ROM2. RAM2 is an operation region for the processes the CPU executes corresponding to the programs in ROM3.

FIG. 3 shows the complete flow of the color process in a color image recording device according to an embodiment of the present invention. When actually printing, the CPU is controlled in the manner shown.

The color image recording device first performs a $\gamma$ process a2 on an RGB signal al such as RGB image data from the computer or RGB color decomposition signals or the like form the scanner or the like, as shown in FIG. 3. It is normally necessary to again perform a $\gamma$ process on the RGB input signal, which is raised to about the 0.45 power beforehand, in order to correct the characteristics of the monitor into a gradation characteristic which is the same as the original image. In addition, by multiplying signals on which the $\gamma$ process was not performed beforehand by the same $\gamma$ as the characteristic on the monitor, a gradation characteristic results that is the same as on the monitor. If necessary, an illuminance-optical density conversion can be conducted prior to the second masking process a3. In general, by conducting this process, it is possible to raise the precision of the masking process.

The second masking process (a3) is generally performed in order to correct the printing characteristic (back trap or the like) of the recording paper and ink and an unnecessary absorption characteristic of the three primary color pigments used in printing. A 3×3 linear transformation matrix computation is simplest and is frequently used. However, because proportionality failures and additivity failures in the ink are produced, a non-linear matrix computation such as 3×9 or 3×10 or the like is also proposed.

In accordance with the program in ROM3, the CPU, after executing the process of a2, in a3 converts the RGB data, which has been input into YMC data, through multiplication by matrix A. This process is executed in RAM2, in which the matrix coefficient A is stored. This YMC data that has been converted is output to the printer hardware 6. Furthermore, the print output a5 is obtained.

Figure 5:
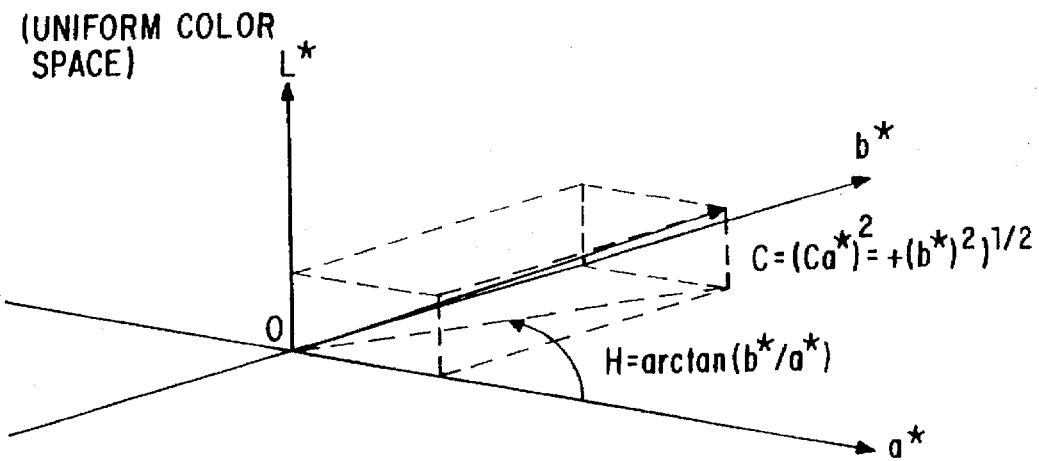
FIG. 5 shows a uniform color space.

FIG. 5 illustrates L*a*b*, which is the one type of uniform color space suitable for the invention.

L* indicates Value. In addition, a* and b, indicate the chroma and hue. In the drawings, the point indicated by the arrow is a point of a particular color. The hue angle H, chroma C and value V of that color are respectively represented as indicated below.

Hue angle: H=arctan (b/a*)
Chroma: $C=(a^{*2}+b^{*2})^{1/2}$
Value: V

In FIG. 5, the color is brighter the larger V becomes. That is to say, the larger the value in the direction of the L* axis becomes, the brighter the color is said to be. In addition, the chroma is larger the larger the value of C. That is to say, the greater the distance from the origin 0 in the a,b* plane direction, the brighter the color that is shown. Furthermore, as shown in FIG. 5, all of the colors are arranged in the order red, yellow, green and blue around the perimeter.

Furthermore, the present embodiment is a color image recording device equipped with a mechanism for finding a matrix coefficient used in the process. Details of computing the matrix coefficient will be described with reference to FIGS. 2 and 4.

Figure 2:
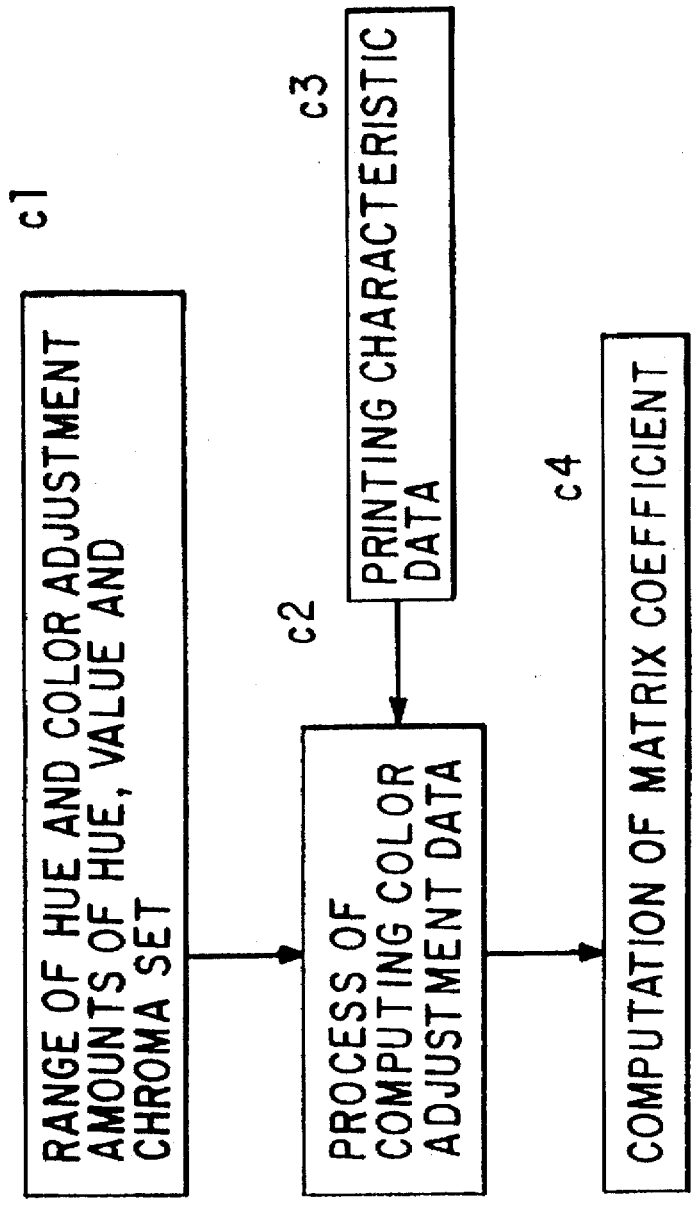
FIG. 2 is a flowchart showing an embodiment of the present invention.
Figure 3:
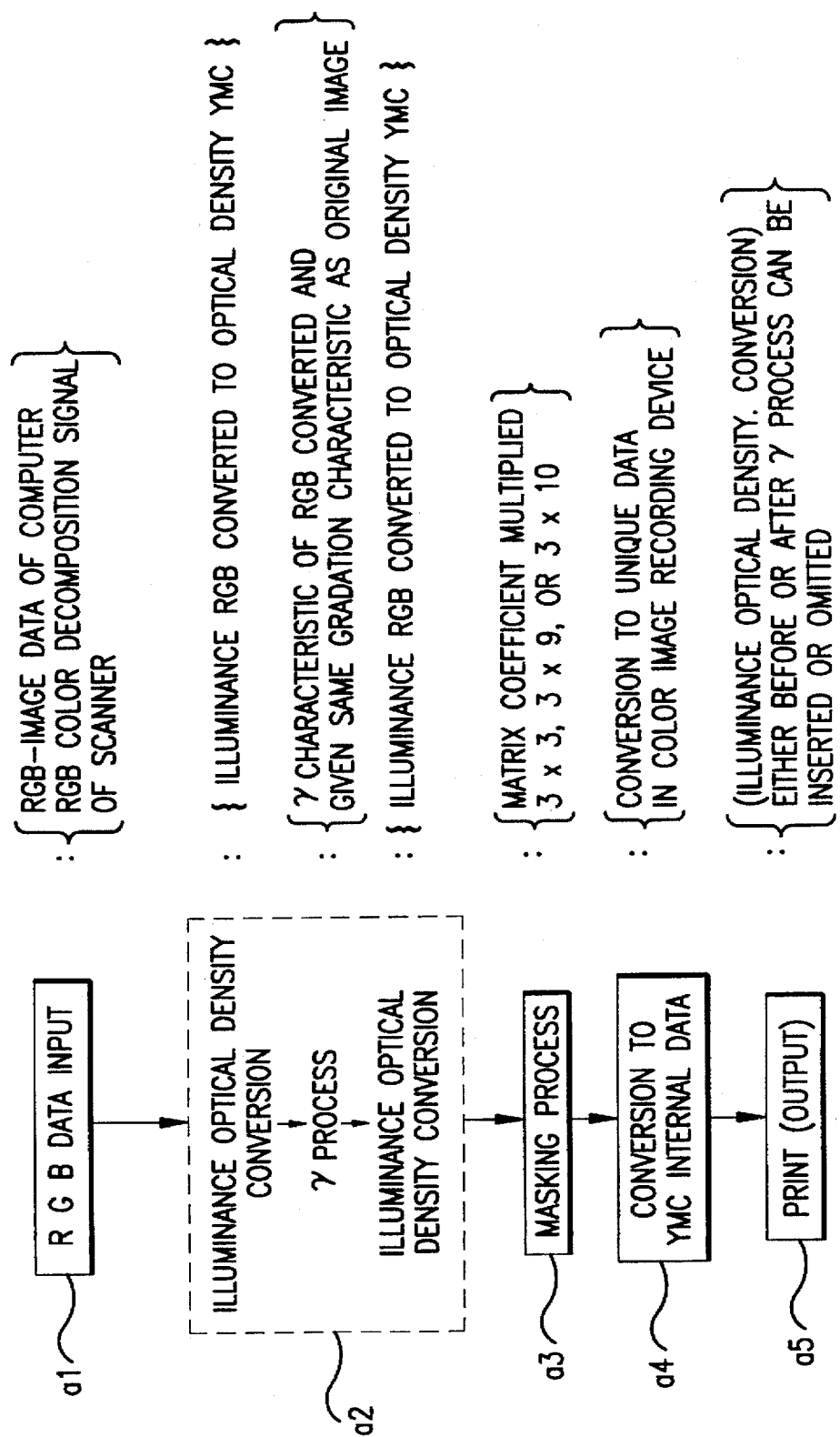
FIG. 3 is a flowchart showing details applicable to all embodiments of the present invention.

FIG. 2 shows the process flow of color adjustment when the operator has selected, by means of the color adjustment setting means, the adjustment amounts of the hue, value, and chroma, and the range over which adjustment within the color space is desired.

As shown in FIG. 2, the present embodiment is such that the amount of color adjustment of the hue, value, and chroma, and the range thereof are set by the user at c1. When a matrix coefficient for the specified range that has been set is computed at c4 by the matrix coefficient computation device, the printing characteristic data c3 recorded in the printing characteristic data recording device are used.

Figure 4:
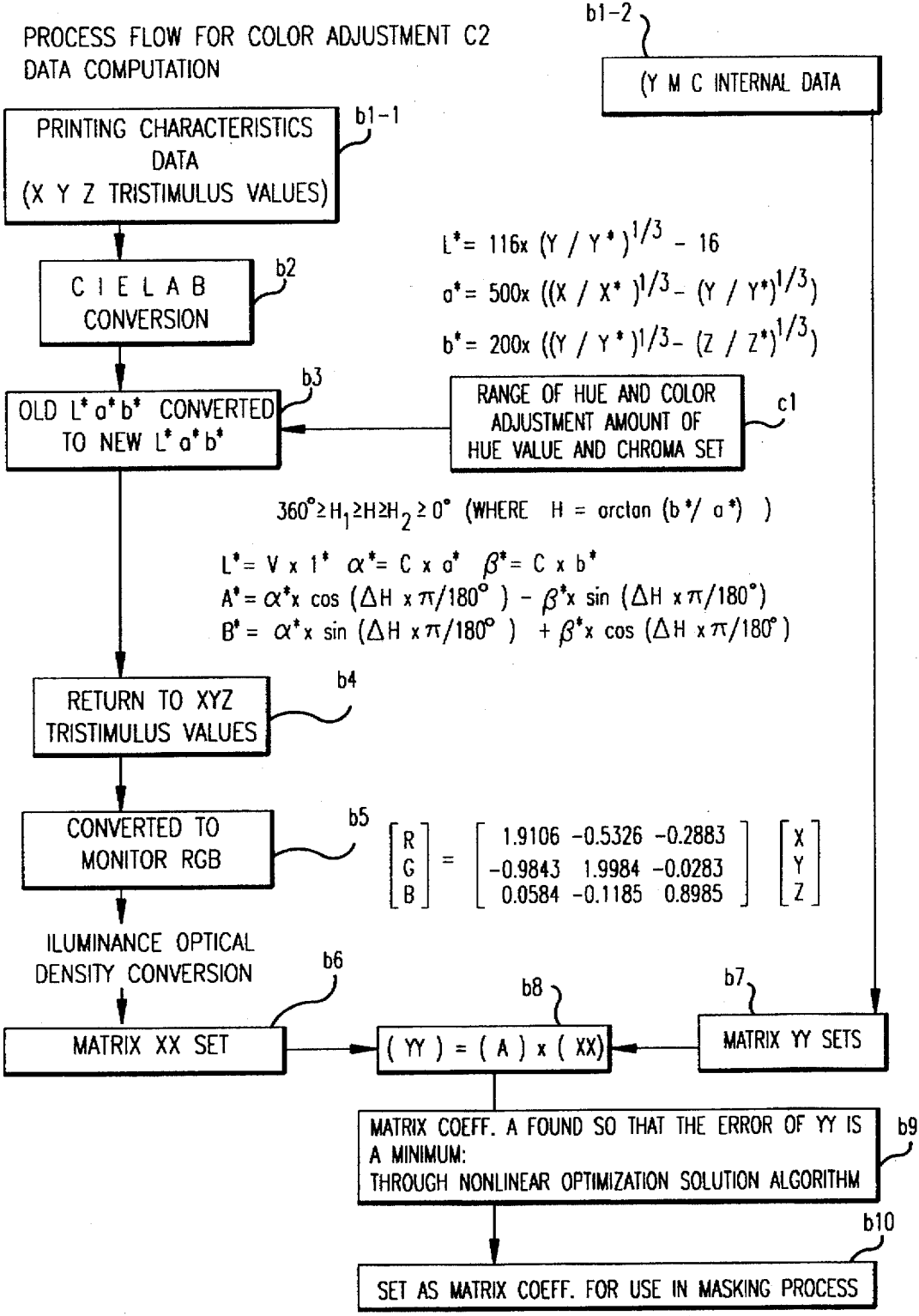
FIG. 4 is a flowchart for a color image recording device using an embodiment of the present invention.

With the examples of FIGS. 2 and 4, only the range of the hue is specified by the setting c1 of the color adjustment amounts. However, it would also be appropriate to specify the value and chroma.

In c1 of FIG. 2, the color adjustments for hue, chroma, and value from the user, and the settings of the range of the hue are received. These settings will be described using the drawing of the uniform color space in FIG. 6 and the drawing of the setting screen in FIG. 13.

Figure 6:
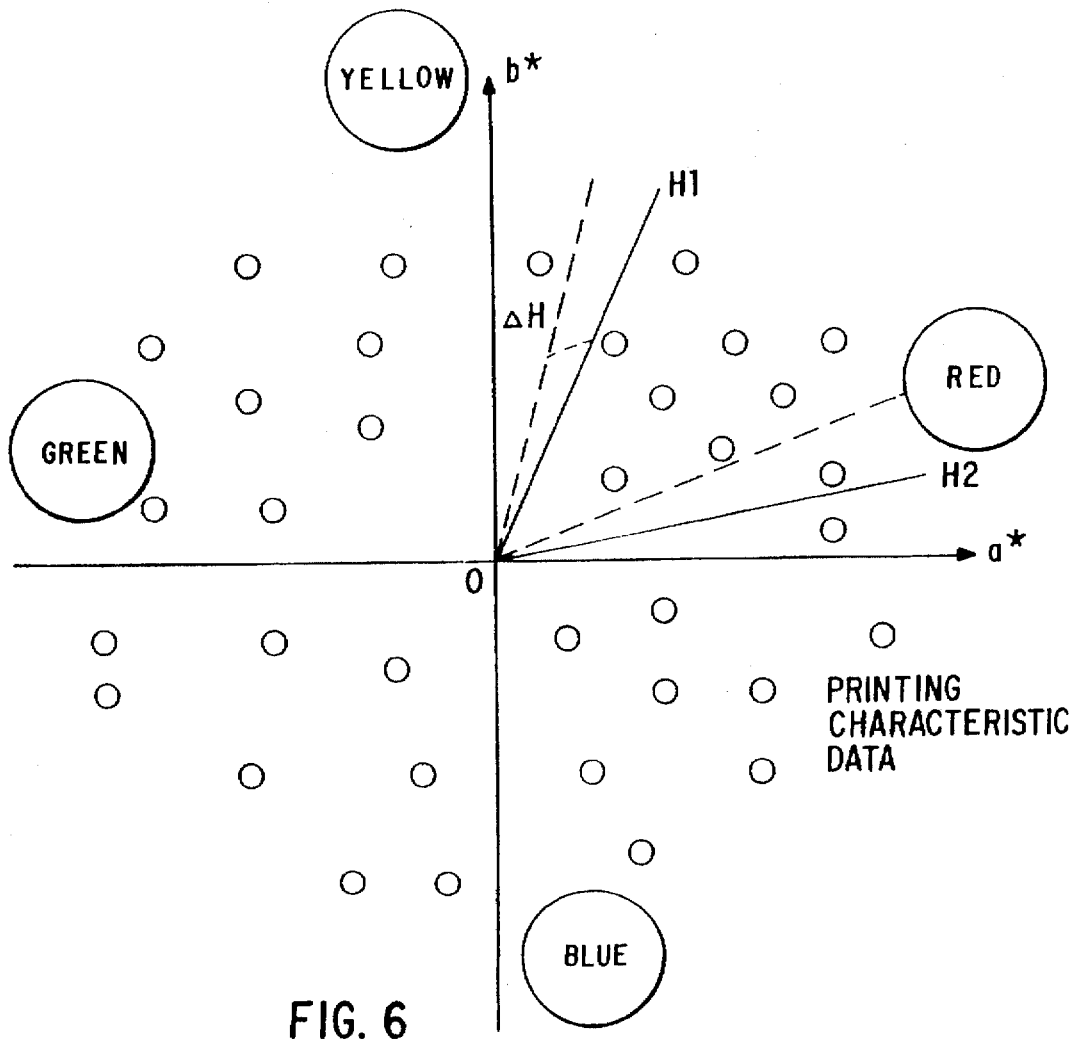
FIG. 6 shows a uniform color space.

In order to simplify the explanation, the Value axis is omitted in FIG. 6.

The user conducts the above-described settings by operating the operation apparatus. Specifically, the hue is selected by selecting the hue button. The red hue button 10r is used to select a hue close to red, the yellow hue button 10y is used to select a hue close to yellow, and the blue hue button 10b is used to select a hue close to blue.

Figures 13, 14:
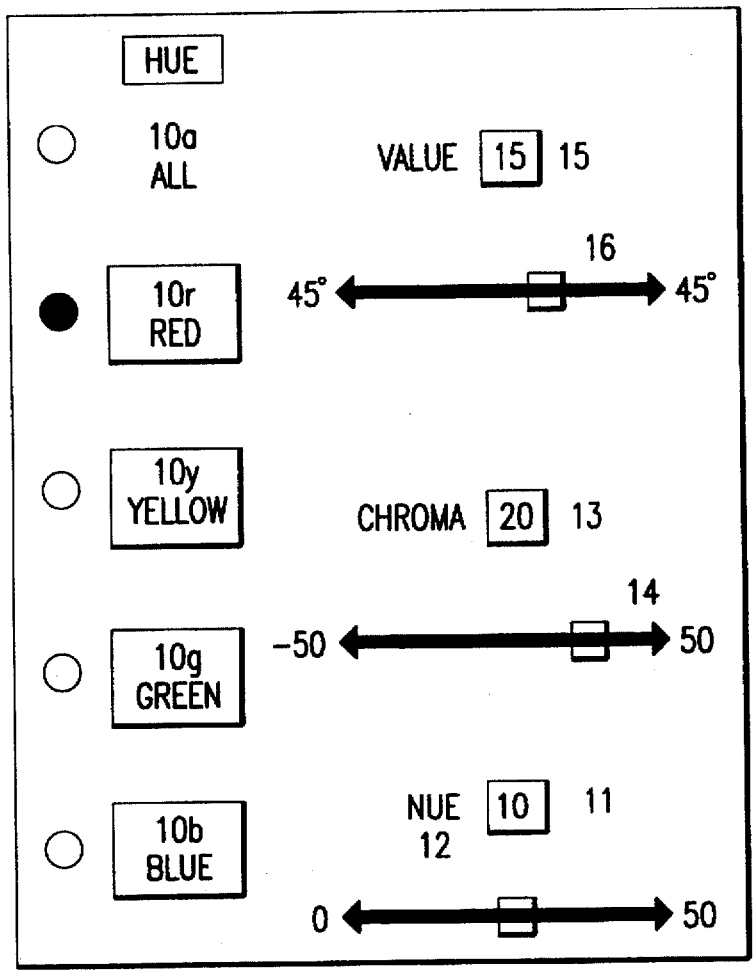
FIG. 13 shows manual setting of the weighting range.
FIG. 14 shows the setting screen of the present invention.
Figure 15:
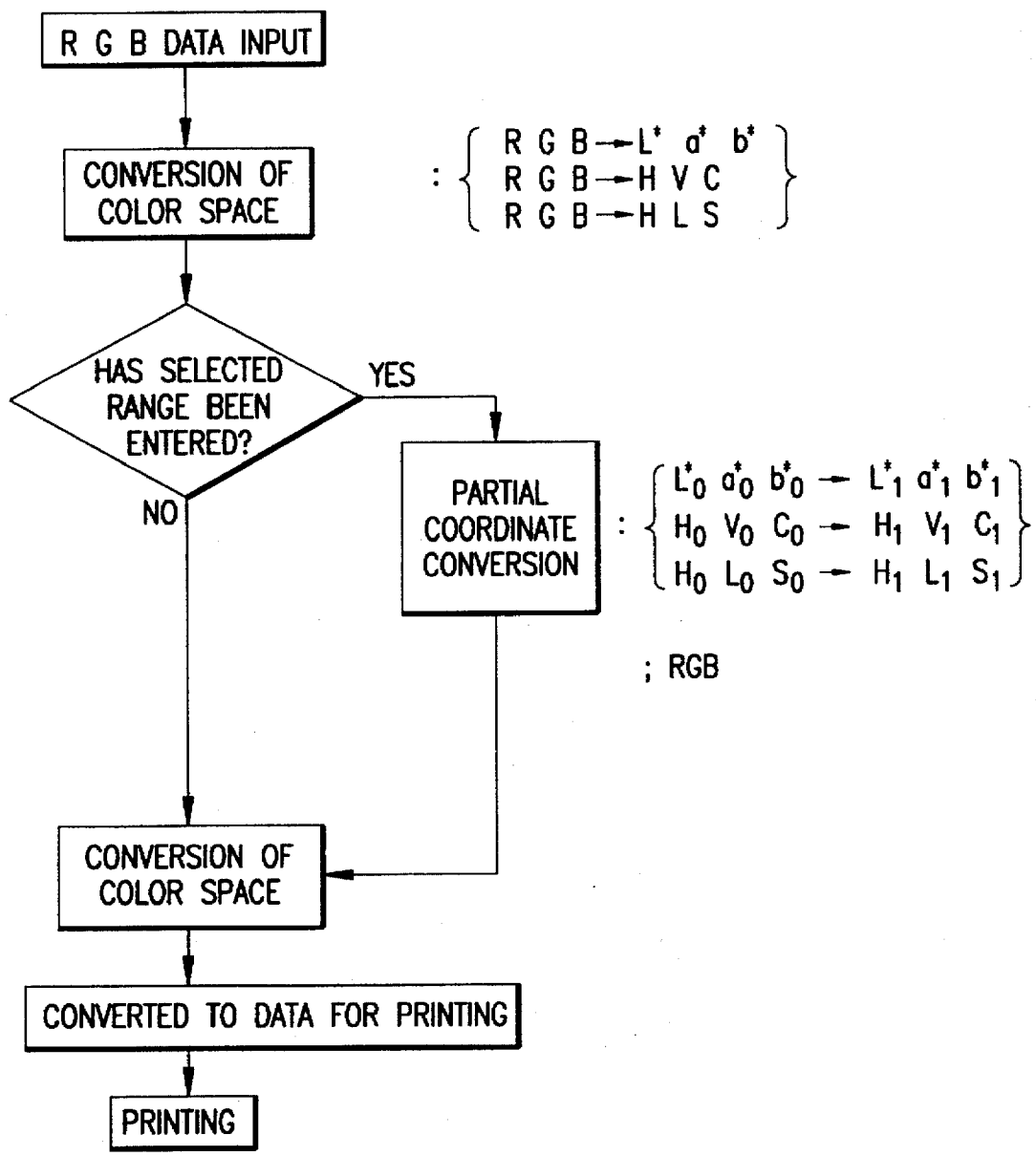
FIG. 15 is a flow chart showing an example of a conventional color image recording device.
Figure 16:
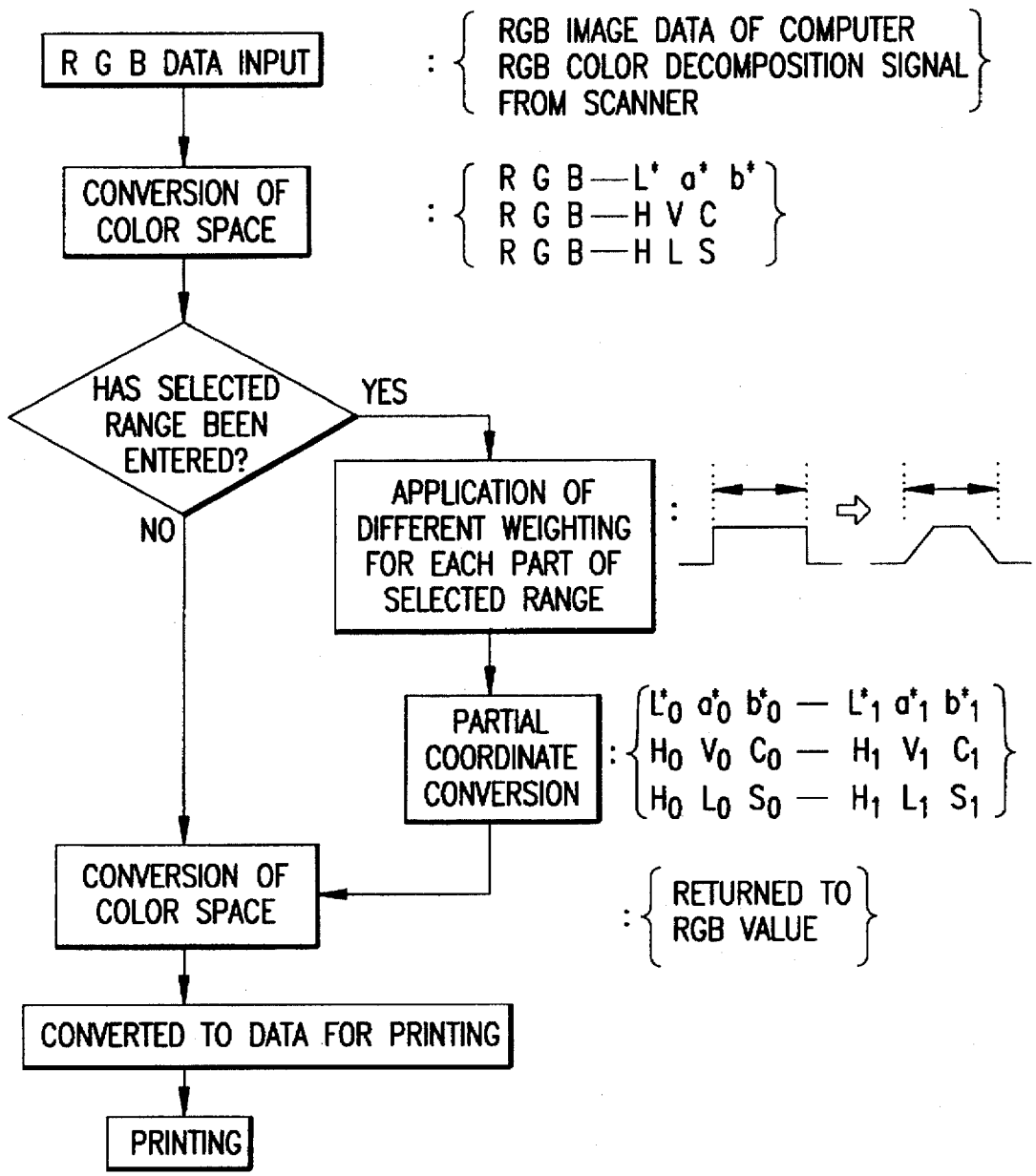
FIG. 16 is a flow chart showing an example of the conventional art.
Figure 17:
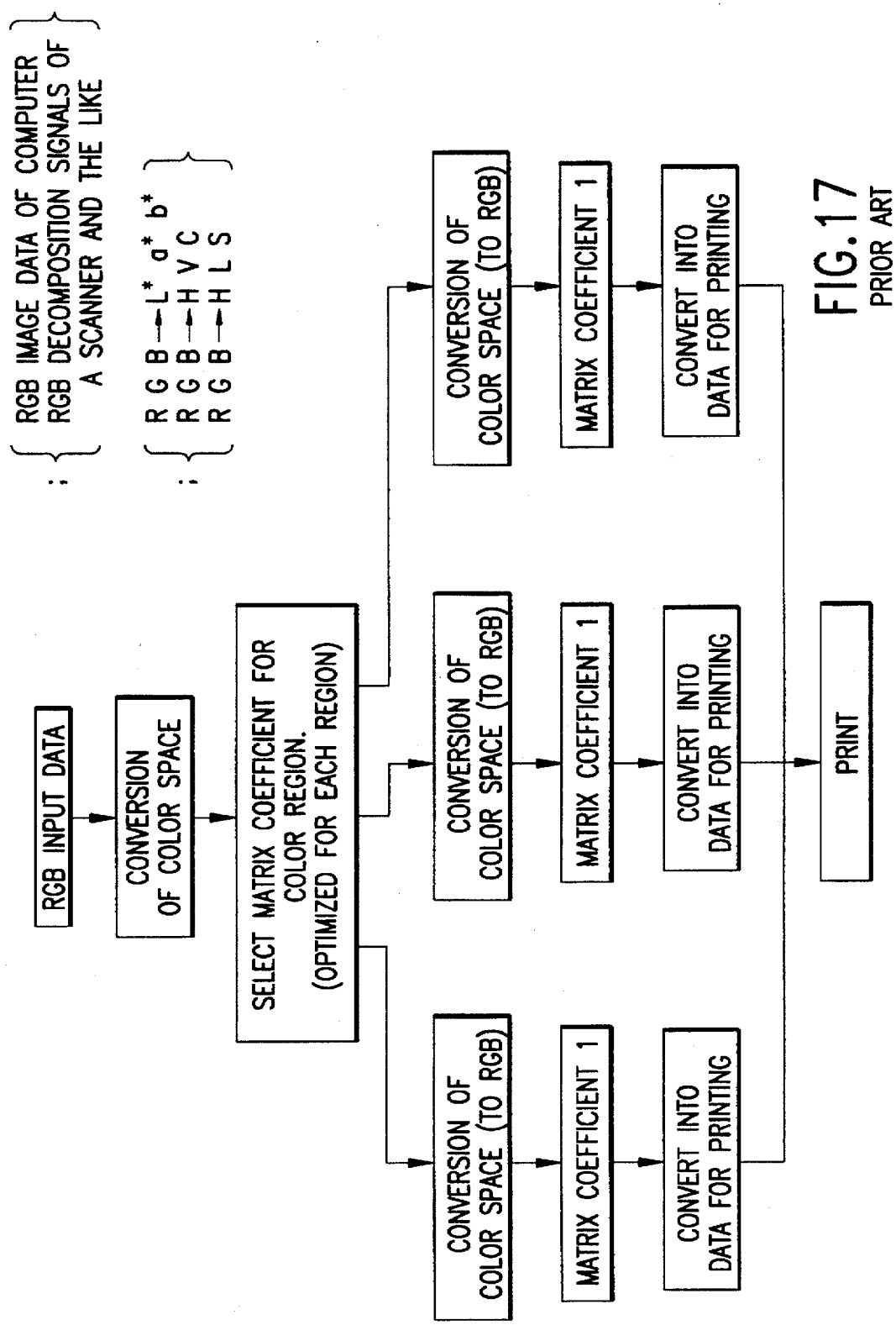
FIG. 17 is a flowchart showing another example of the conventional art.

FIG. 13 illustrates the case wherein a hue close to red has been selected. In this case, a hue between H1 and H2 is selected, is shown in FIG. 6.user can se the user can select hues close to yellow, green, or blue.

Next the user conducts color adjustments of the hue, Value, and chroma. FIG. 13 illustrates the changing of the hue. The number of degrees by which the hue is to be changed in the uniform color space is input into the hue change box 11. In FIG. 13, fifteen degrees has been input. When 15 degrees is input, the hue rotates 15 degrees clockwise about the origin O as shown in FIG. 6. Because red has been selected in FIG. 13, the red hue is caused to change to reddish-yellow hue.

In addition, it is possible to conduct this hue change by dragging the hue change bar 12 to the left or right using a mouse. In this instance, the value of the hue change box 11 also changes in accordance with the hue change bar 12.

The chroma can also be changed. The amount by which the chroma is to changed in the uniform color space is input into the chroma change box 13. The chroma increases when the input value is positive and decreases when the input value is negative. The absolute value of the input value corresponds to the amount of change in the chroma.

It is also possible to conduct this chroma change by dragging the chroma change bar 14 to the left or right using a mouse. In the instance, the value of the chroma change box 13 also changes in accordance with the chroma change bar 14.

The Value can also be changed. The amount by which the Value is to be changed in the uniform color space is input into the Value change box 15. The Value increases when the input value increases and decreases when the input value decreases.

It is also possible to conduct this Value change by dragging the Value change bar 16 to the left or right using a mouse. This movement causes the value of the Value change box 15 to change in accordance with the Value change bar 16.

In FIG. 4, steps b1-1 to b4 illustrate the process of color conversion from step c2 in FIG. 2. In addition, b5 to b10 in FIG. 4 illustrate the process of computing a matrix coefficient from c4 in FIG. 2.

In b1-1 in FIG. 4, out of the printing characteristic data, only the XYZ tristimulus value, is loaded into RAM1. In b2, the printing characteristic data 20 is converted into data corresponding to the uniform color space (CIELAB) as shown in FIG. 5 from the XYZ tristimulus values, in RAM1.

In b3, the uniform color space (CIELAB) is converted on the basis of the settings made in c1 of FIG. 2. This conversion converts the uniform color space in the opposite direction of the user settings. For example, as shown in FIG. 13, when the user desires to convert the hue 15 degrees clockwise, the hue is rotated by ΔH=15 degrees counterclockwise, as shown in FIG. 6. Therefore, it is possible to obtain matrix coefficient A that can obtain the hue desired by the user.

Similarly, when the chroma is set to a positive number in c1, the uniform color space is converted in the negative direction in b3. In addition, when the chroma is set to a negative number in c1, the uniform color space is converted in the positive direction in b3.

The matrix coefficient A, which has been computed in b9, is stored in RAM2.

In actuality, in order to prepare the printing characteristic data c3 in advance, an arbitrary 100 data items were printed by the printer and the output results were measured by a spectrophotometer. The measurement conditions were accomplished under condition O-d, with a 2° field of view, using the C standard light of CMS-35SP made by Murakami Shikisai Kenkyusho K.K. Furthermore, by causing these measurement results and the printer input signals to coincide, 100 pairs of printing characteristic data were found with the pairs being the XYZ tristimulus values and the YMC internal data (data which controls the gradations of the printer). This data was recorded in the printing characteristic data recording means. This data is preferably taken to be data of the color which is positioned uniformly in the CIELAB color space. In addition, it is preferable for the number of items to be as large as is practically possible. As a result, it is possible to obtain an image with good color rendering. However, to the extent that the number of printing characteristic data items is large, time and memory requirements are increased.

Furthermore, through the printing characteristic data c3 that has been recorded in the printing characteristic data recording device, and through the setting c1 of the range of the hue and the color adjustment amount of the hue, value, and chroma by the color adjustment setting device, the process c2 of computing the color adjustment data is accomplished by the color adjustment data computation device. As a result, a matrix coefficient used in the masking process of FIG. 3 is obtained.

This color adjustment data computation process c2 will be described more specifically with reference to FIG. 4.

FIG. 4 shows the process flow of the color adjustment data computation unit, and as explained above, in the present embodiment, the printing characteristic data c3 of FIG. 2 is formed as a combination of the 100 XYZ tristimulus values (b1-1) and the YMC internal data (b1-2).

Accordingly, in this color adjustment data computation unit, the 100 XYZ tristimulus values b1-1 are first converted to the respective CIELAB by the first color conversion process b2. The conversion formula is according to JIS Z8729. The converted values are taken to be 1*, a* and b*.

Next, these values are converted at b3 to new L*, a* and b* by the second Color conversion process in accordance with the following equation, using the range of values H1 and H2 of the hue, each of the adjustment values ΔH, V and C of the hue, value, and chroma determined by the setting c1 of the range of the hue, and the color adjustment amounts of the hue, value and chroma.

However, conversion is accomplished on the printing characteristic data b1-1 corresponding to the condition below:

$$360° \geq H1 \geq H \geq H2 \geq 0° \quad (1)$$

(Here, H=arctan (b*/a*))
L=V×l*
α*=C×a*
β*=C×b*
A*=α*×cos (ΔH×π/180°)−β*×sin (ΔM×π/180°)
B*=α*×sin (ΔH×π/180°)+β*×cos (ΔH×π/180°)

Next, these new L, a* and b* values are converted at b4 to XYZ tristimulus values by the third color conversion process. Again, The conversion formula is according to JIS Z8729.

Furthermore, these values are converted at b5 to monitor RGB values by the fourth color conversion process. Here, the assumption is that the conditions are the same as the measurement of the printing characteristic data, and RGB characteristic of NTSC is taken into consideration. The conversion formula is shown in FIG. 2.

In the cases wherein HVC color spaces and HLS color spaces are used, the hue is specified similarly, and the adjustment amounts of the hue, value, and chroma are set and converted.

Next, the data of the 100 sets of RGB signals that were obtained as results were converted into respective illuminance-optical densities. The conversion formula used LOG(R / 255), LOG(G / 255), and LOG(B/255), but could use the illuminance-optical density conversion which is actually used in FIG. 3. A logarithmic function was used, but it would also be appropriate to perform the conversion using tables.

Next, these calculated results were made into a matrix [XX] at b6 by the matrix coefficient computation unit, at b7 the YMC internal data b1-2 was made into a matrix [YY], and at b8 a matrix [A] such that [YY]=[A]×[XX] was found. The method of least squares was performed in order to minimize the errors in [YY] with respect to the 100 data items. It would also have been appropriate to use another non-linear optimization algorithm.

In this way, it is possible at b10 to find a matrix coefficient for use in the masking process of FIG. 3. Printing is accomplished after converting the RGB signals to YMC image data using this matrix.

The embodiment of FIG. 3 was described for the case of the three colors YMC. The process also applies to a four color situation such as YMCK.

In other words, the process is similar up to the step of finding an [A] such that [YY]=[A]×[XX]. The above-described embodiment takes [YY]=[YMC], and printing of each color is performed using values that are in one-to-one correspondence with each of the YMC colors. However, in the case of the four colors YMCK, the color K (black) is determined from the YMC values, and printing of the four colors YMCK is performed. The following conversion formula can used and the original YMC values decrease by the following amount:

$$[Y1M1C1]^T = [YMC]^T - \alpha(K-\beta)[111]^T \quad (2)$$

where K=min (YMC), and α and β are constants.

With the present embodiment, the calculation process was performed using a host computer to which the color image recording device is connected, but it is possible to perform the process on the color image recording device side with a color image recording device which is partially or completely integrated into the printer.

With the present embodiment, a color image recording device is provided in which it is possible to find in advance the matrix coefficient used to convert RGB signals to YMC image data. The matrix coefficient adjusts and converts the specified color tone by only a set amount and makes color data that adjust the color tones that approximate the specified color tone in accordance with the level of approximation. Printing that modifies the selected color tone is therefore possible. Even when printing is performed from image data in which the data amount is large, it is possible to realize a selective color adjustment for good hue, value, and chroma in a short computation time in comparison with conventional methods.

As described above, with the present invention the matrix coefficient used to form the color data from the RGB signal is formed by the matrix coefficient computation unit and a conversion is performed. The color image recording device adjusts the hue, value, and chroma through a selective color correction and processing time does not increase. In addition, it is possible to record color images with sufficiently good color rendering and with good color continuity in the boundary of the selected color.

Furthermore, if the system is one which ordinarily performs color rendering using a matrix coefficient, it is possible to make this color adjustment function through a simple method.

Furthermore, it is possible to easily conduct conversion on the basis of international standards and matrix computation is simplified. It is also possible to form a matrix suitable for forming the color data appropriate for printing.

In addition, setting of the color correction is easy and it is possible to perform swiftly and easily the color correction and matrix computation. It is also possible to compute easily the appropriate conversion matrix.

Furthermore, a computer is provided with which color printing is possible along with CRT display. Easy color adjustment of the printing on the basis of the RGB signal of an image processing device or the like is accomplished. Further, the printer is capable of rapid printing.

Figure 7:
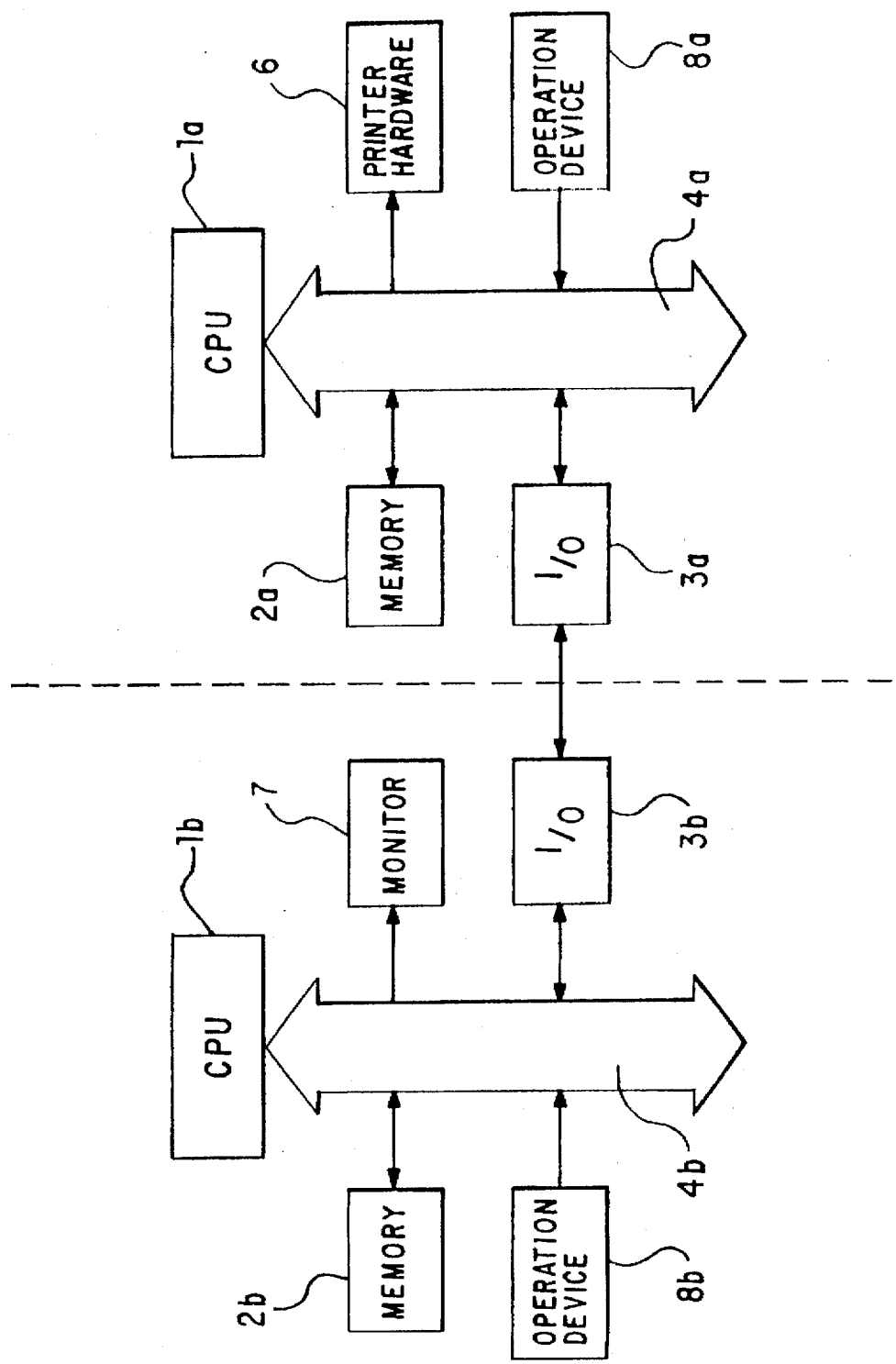
FIG. 7 is a block connection diagram showing an embodiment of a color image recording device and a color image recording system of the present invention.

Another embodiment of the present invention is described hereafter, with reference to FIG. 7.

FIG. 7 is a block connection diagram showing a color image recording device and a color image recording system of the present embodiment.

In FIG. 7, the color image recording device comprises a printer unit and a computer unit (or a scanner unit). The printer unit and the computer unit comprise an independent CPU circuit 1a and 1b, respectively. The CPU circuit 1a exchanges data with the CPU circuit 1b through a bus line 4a, I/O circuit 3a, I/O circuit 3b and a bus line 4b. Memories 2a and 2b are used as the operations area of the program. A weighting process is conducted through the use of the memories. The result of the operation is recorded by printer hardware 6 and is displayed on a monitor 7. The input of the setting value and the like to the CPU circuit 1a and 1b is carried out through the operation device 8a or 8b. Here, the computer unit (or a scanner unit) may be provided as an external device of the color image recording device.

Figure 8:
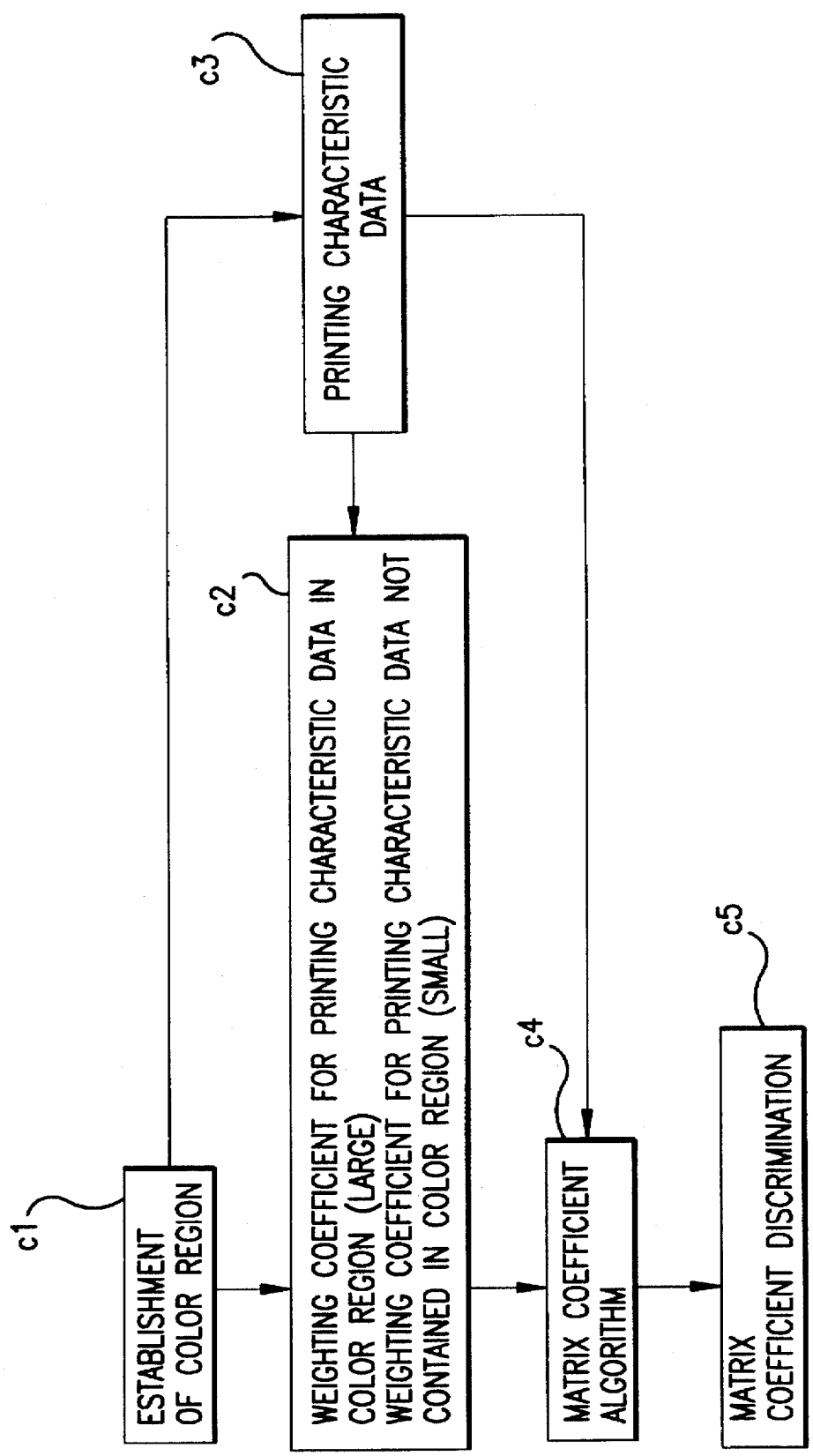
FIG. 8 is a flow chart showing an operation of an embodiment of the color image recording device of the present invention.

A process for computing a matrix coefficient will be described in detail using FIGS. 8 and 9. FIG. 8 shows a process for computing a matrix coefficient to be used for the rendering of more accurate color in the color region specified by the operator. The present invention is unique in the sense that the printing characteristic data, which are prepared beforehand, are read in step c3 and weighted step c2, depending on whether or not the data are in the specified color region, before using the data in computing the matrix coefficient in step c4 for the established color region in step c1.

A portion of the printing characteristic data may be CIELAB, CIELUV, XYZ tristimulus value, or Yxy value. The other printing characteristic data are unique to the color image recording device. The data unique to the color image recording device are digital values with a one-to-one correspondence to the gradation of three colors Y(yellow), M(magenta) and C(cyan) on the print paper.

Moreover, the establishment of the color region in step c1 includes discrimination of the XYZ tristimulus value, which is one of the printing characteristic data items corresponding to the color region established by the operator, in a uniform color space, and setting of weighted coefficients for each of the data items. Alternatively, the weighted coefficient for the data may be established by automatically recognizing the color region of the image data to be input and by discriminating the XYZ tristimulus value, which is one of the corresponding printing characteristic data, in uniform color space.

Moreover, in the matrix coefficient algorithm process of step c4, the matrix coefficient may be computed using a method of least squares and taking the weighted coefficient determined into consideration, but any one of the non-linear optimization algorithms can be used.

Figure 9:
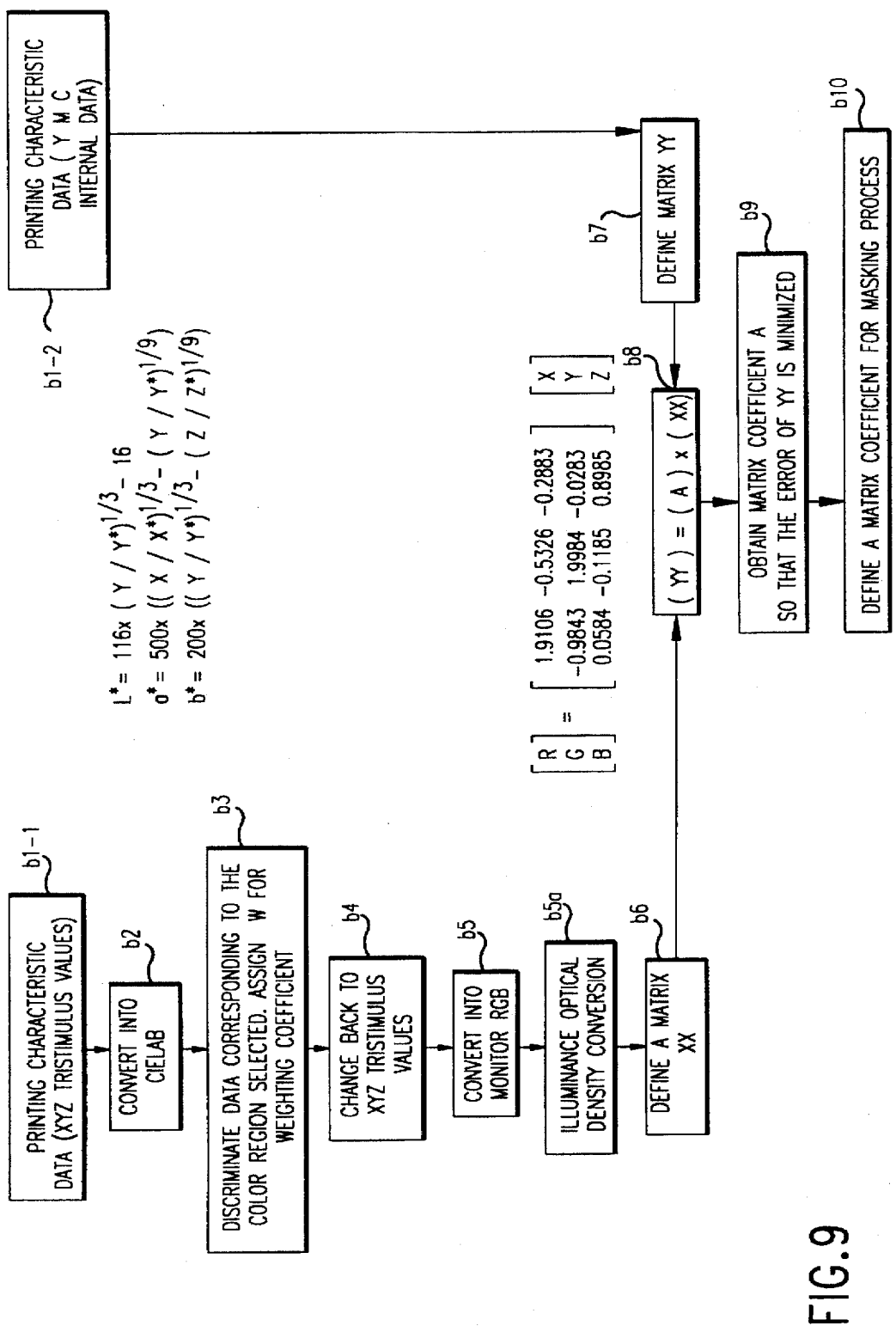
FIG. 9 is a flow chart showing an operation of an embodiment of the color image recording device of the present invention.

Moreover, FIGS. 8 and 9 assume that the color region is established by the operator. However, weighting of the printing characteristic data may be performed automatically by the corresponding color region included in the image data being input.

The case in which the weighting area is set manually will be described with reference to the uniform color space of FIG. 10 and the setting screen of FIG. 13. In order to simplify the explanation, the Value axis is omitted from FIG. 10. The user executes the below described settings through operation of an operation apparatus.

The user first sets the weighting selection mode by operating the operation apparatus. Furthermore, the user selects the hue. Specifically, the user selects the hue by clicking a mouse on the hue button. The red hue button 10r is used to select a hue close to red, the green hue button is used to select a hue close to green, and the yellow hue button is used to select a hue close to yellow.

Figure 10:
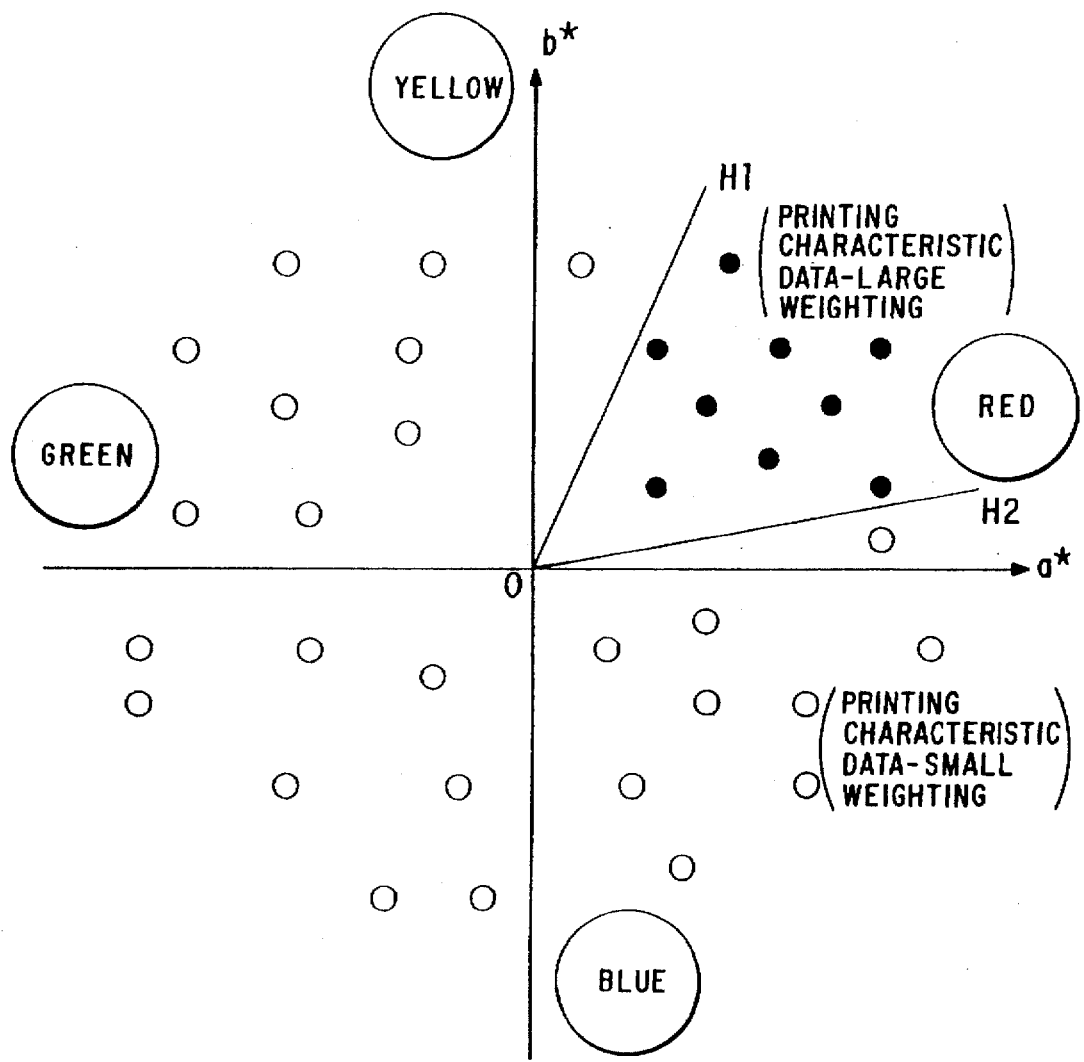
FIG. 10 illustrates a uniform color space.

FIG. 10 illustrates a case in which a hue close to red has been selected. In this case, a hue between H1 and H2 is selected, as shown in FIG. 10. The black dots are the printing characteristic data in which the weighting is large, while the white dots are the printing characteristic data in which the weighting is not large. When the settings are thus made, colors from red to orange are faithfully reproduced. However, it is also possible for the user to select hues for yellow, green, and blue.

Data corresponding to printing characteristic data in this area is weighted. In b3 of FIG. 9, the weighting coefficient is set to 10. The value of the weighting coefficient need not be restricted to 10 as long as it is larger than one.

Figure 11:
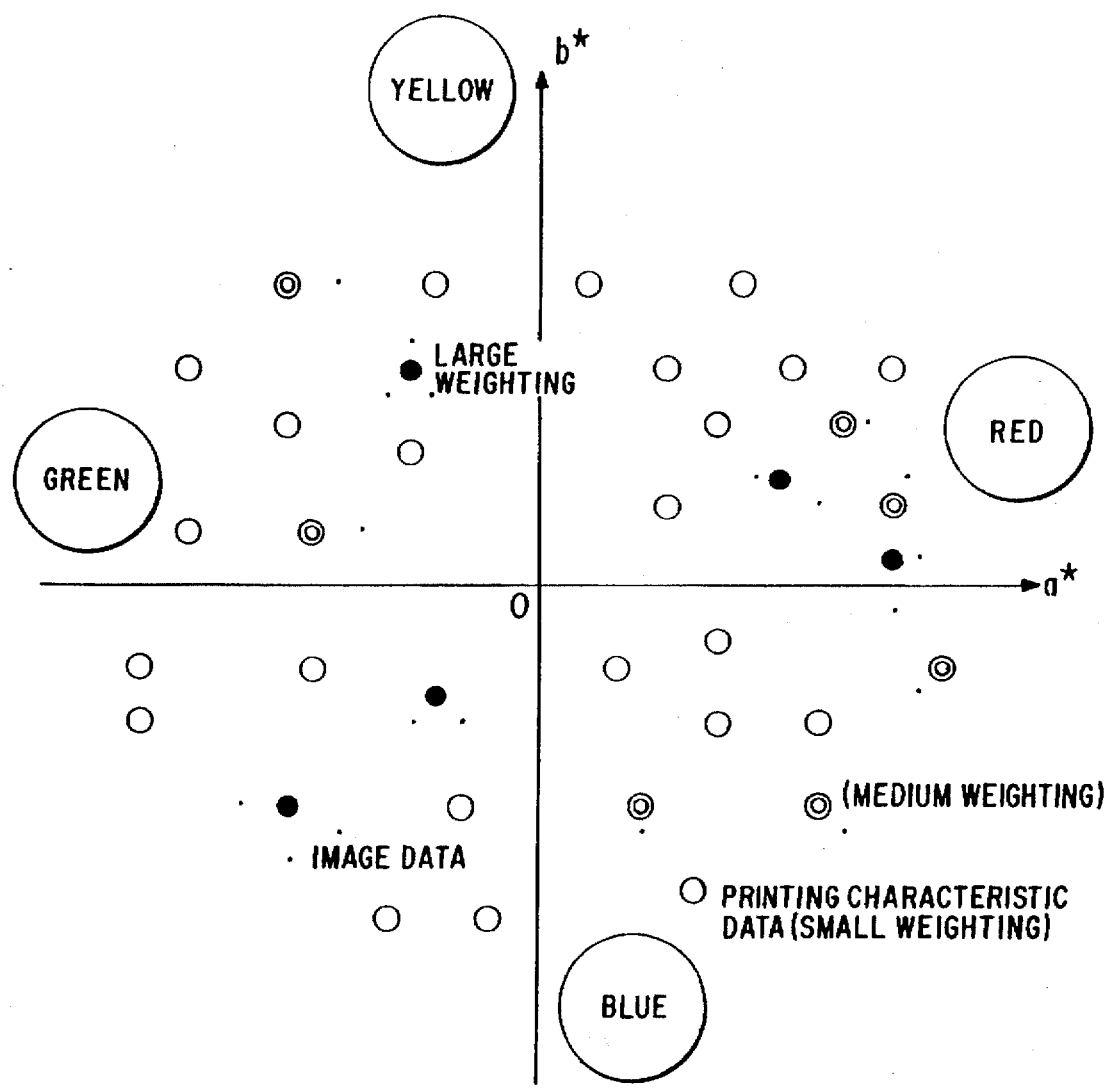
FIG. 11 shows automatic setting of the weighting range.

The automatic setting of the weighting range is shown in FIG. 11. Weighting in FIG. 11 is conducted when the "all" button 10a in FIG. 13 is selected. In the automatic setting mode, the image data to be printed is unfolded once in the uniform color space. Next, a computation is made to determine if there are several items of image data near each of the printing characteristic data items. Settings are then made so that a larger weighting is given in the proximity of large amounts of image data.

In FIG. 11, points having no data items nearby are indicated by white dots and are given a weighting of 1. Points having one data item nearby are indicated by double dots and are given a weighting of 5. In addition, points wherein there are two or more data items nearby are indicated by the black dots and are given a weighting of 10. Through this weighting procedure, it is possible to accurately express colors that account for a large portion of the image.

Automatic setting may also be accomplished by setting the weighting of the weighting coefficient for each hue, each chroma, and each value beforehand.

The setting screen shown in FIG. 14 creates a display on a monitor. The user selects one out of the portrait button 20, the scenery button 21, and the C G button 22 using the operation apparatus. In FIG. 14, the portrait button 20 has been selected. The weighting of the skin-color selection area is therefore given emphasis, as shown in FIG. 12.

Figure 12:
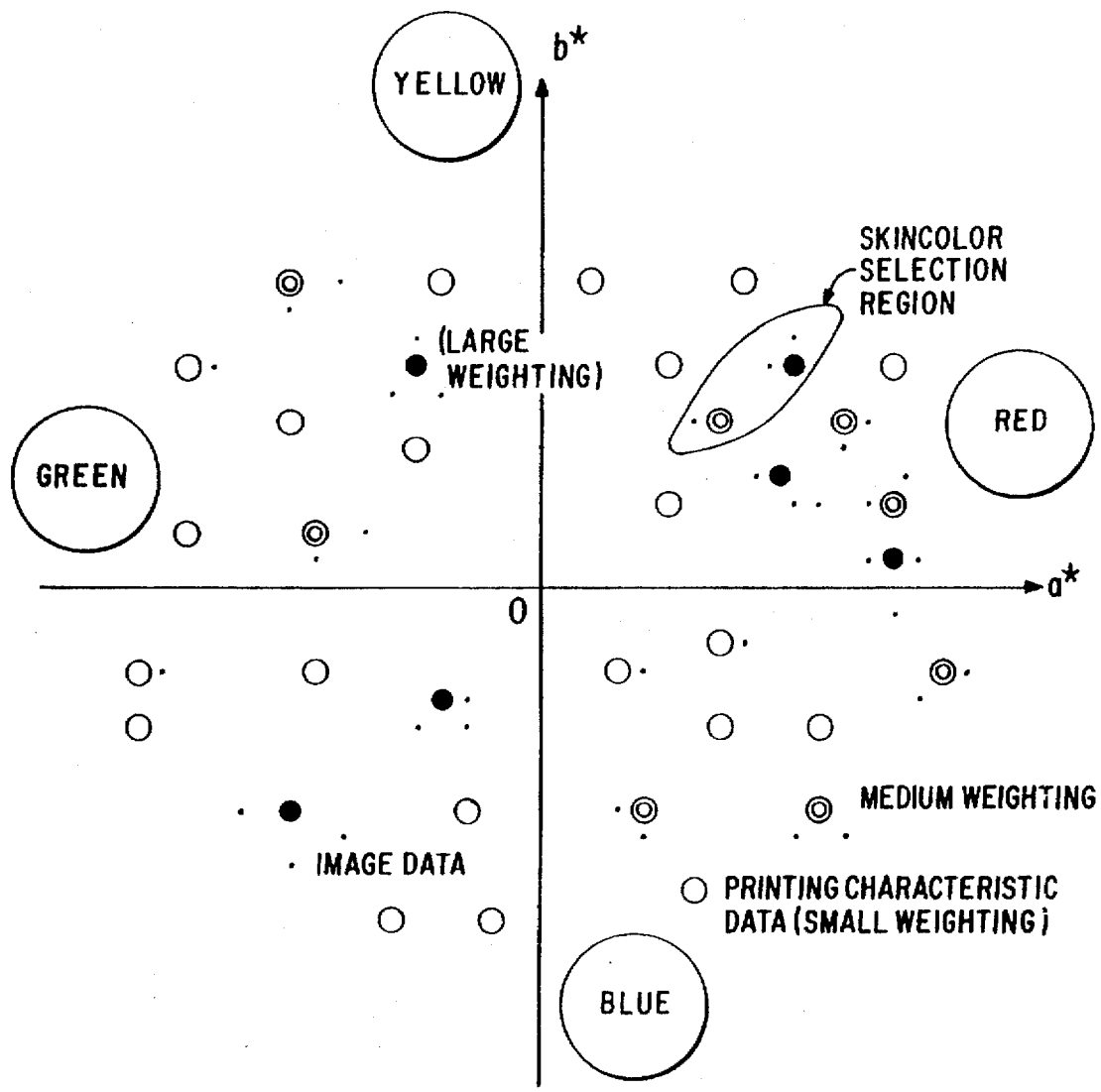
FIG. 12 is an example of a uniform color space in which a region has been selected.

In the example of FIG. 12, if the region is the skin-color selection region, when the number of data items nearby is 1, the point is shown by a double dot and the weighting is 5. In addition, in the skin-color selection region, when the number of data items is 2 or more, the point is shown by a black dot and is given a weighting of 10.

However, if the region is outside the skin-color selection region, when the number of nearby data items is 1, the point is shown by a white dot and is given a weighting of 1. In addition, when the number of nearby data items is 2, the point is shown by a double-dot and is given a weighting of 5. Furthermore, only when the number of nearby data points is 3 or more is the point represented by a black dot and given a weighting of 10.

By setting the weighting of the weighting coefficients for each hue, it is possible to obtain a faithful color reproduction for a particular color automatically using the weighting of the weighting coefficient determined beforehand and the surface area accounted for by each color in the image data.

Additionally, a scenery button 21 can be selected. In this instance, the weighting of the color blue is emphasized. When the CG button 22 is activated, a process is executed that provides a weighting for an image of the chroma smaller than the predetermined area.

In an experiment, in order to prepare printing characteristic data to be read in step c3, 100 arbitrary data are printed by printer hardware 6, which is a color recording device, to be color corrected later. The output results are measured by a spectro-photometer (Murakami Shikisai Kenkyusho KK CMS-35SP). Measurement conditions are C-standard light, vision field 2° and O-d. A pair of XYZ tristimulus values and YMC internal data (data to be used to control gradation of the printer hardware 6), totalling 100, is obtained. These data are preferably arranged uniformly in the CIELAB color space. Moreover, the number of data items should be as many as practically possible. However, the greater the number of data items, the longer it takes to compute the matrix coefficient and the larger the capacity of the memory 2a will need to be in order to store the data.

With reference to FIG. 8, the weighted coefficient for each data item of the printing characteristic data from step c3 is determined by establishing the color region at step c1. The matrix coefficient algorithm process is executed at step c4 using the weighted coefficient and the printing characteristic data from step c3. As a result, the matrix coefficient to be used in a masking process of step a3 of FIG. 3 (which also applies to the present embodiment) is obtained.

FIG. 9 illustrates an actual example of a process flow to execute more accurate color rendering in a specified color region.

As described above, in the present embodiment, the printing characteristic data comprise a set of 100 XYZ tristimulus values and YMC internal data. First, 100 XYZ tristimulus values are read in step b1-1, as shown in FIG. 9, each of which is converted to CIELAB in step b2. JIS Z8729 is used as a conversion formula.

Next, the data corresponding to a selected color region are discriminated on the LAB which is a uniform color space and weighting of the corresponding data is assumed to be 10 at step b3. However, this weighting value is variable and depends on the total number of data items and the like. The weighting value of the data which do not correspond is set to be 1. Next, the converted Lab values are again changed to XYZ values in step b4. However, the XYZ tristimulus values read in step b 1-1 may also be used.

The values are further converted to RGB values of the monitor 7 in step b5. Here, RGB characteristics of NTSC are considered assuming a situation in which the monitor 7 is viewed under the same conditions as measuring of printing characteristic data. The conversion formula is shown in FIG. 9.

Next, each of the resulting 100 sets of RGB data are illuminance-optical density converted as step b5a. As conversion formulas -LOG(R/255), -LOG(G/255), -LOG(B/255) are used but the illuminance-optical density conversion from step a2 which is actually used in FIG. 3 can be used. Here, logarithmic functions are used but conversion may be performed using table values.

Next, a matrix [IX] is obtained from the results of the computation in step b6 and a matrix [A] is computed to satisfy a relational equation [YY]=[A]×[XX]. [YY] is found in step b7 and denotes a matrix [YY] formed by YMC internal data read in the step b1-2. Here, the method of least squares is used to minimize the error of [YY] as described in step b9. Normally, the matrix [A] is obtained so that the error of the original 100 data is minimized but in the present embodiment, weighting is also taken into consideration. For example, assuming that there are 20 data items corresponding to weighting, the method of least squares is used to minimize the error of 20×10+(100−20)=280 data.

Moreover, though the method of least squares is used here, other non-linear optimization algorithms may be used as well. Thus, the matrix coefficient for masking processing performed in step a3 in FIG. 3 is obtained in step b10.

In the present embodiment, the algorithm is performed in the color image recording device side (CPU circuit 1a) but all or part of the algorithm may be performed by the host computer (CPU circuit 1b) to which the color image recording device is connected. Moreover, any one of a color heat fusion transfer printer, a color heat sublimation type printer, a color ink jet printer, and electronic photo type color printer may be used as a color image recording device.

In the embodiment described above, an accurate color rendition of the desired color region is achieved in a shorter algorithm time than with conventional methods.

The color image recording device of the present invention computes only one matrix coefficient immediately before printing for color correction which creates a more accurate color rendition for the desired color region. Moreover, in the algorithm process, the weighting coefficient is determined only for the color region corresponding to the printing characteristic data prepared beforehand. The remaining algorithm is performed using the same method as for the computation of a regular matrix coefficient. Therefore, shortening of processing time is achieved even when a large amount of image data must be printed. The reduction in processing time occurs because it is not necessary to select the optimum matrix coefficient for all of the image data as in the prior art.

Furthermore, even in the boundary section of the color region selected, a drastic change in color tone does not occur because only one matrix coefficient rather than a plurality of the matrix coefficients is used. Use of a simple method without an algorithm to process boundary color is enabled. Moreover, any of the conventional color image recording devices which executes color rendition using matrix coefficients may easily be able to add the color correction function of the present invention (for example, by changing software).

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the scope of the invention as defined in the following claims.

What is claimed:

1. A color image recording device that forms color data for printing by adjusting a color of an RGB signal from an input device, the color image recording device comprising:

printing characteristic data recording means for recording printing characteristics of a printing device;

color adjustment setting means for determining color adjustment in a selected color region having a uniform color space;

color adjustment data computation means for correcting a data value of the printing characteristic data recording means by a setting amount of the color adjustment setting means; and a matrix coefficient computation means for computing a matrix coefficient in order to convert the RGB signal into data unique to the color image recording device using results of computations of the color adjustment data computation means and the data from the printing characteristic data recording means, wherein the color adjustment data computation means conducts data conversion on the printing characteristic data in the uniform color space.

2. The color image recording device according to claim 1, wherein the uniform color space is one of a CIELAB and CIELUV color representation system.

3. The color image recording device according to claim 1, wherein one part of the printing characteristic data is one of XYZ tristimulus values and Yxy values, and additional parts are data unique to the color image recording device.

4. The color image recording device according to claim 1, wherein the data unique to the color image recording device comprise at least the three colors yellow, magenta, and cyan.

5. The color image recording device according to claim 4, wherein the data unique to the color image recording device further comprise black.

6. The color image recording device according to claim 1, wherein the data unique to the color image recording device are digital values with a one-to-one correspondence to gradations on four color print paper.

7. The color image recording device according to claim 1, wherein the color adjustment setting means is used to adjust the colors selectively of only the color region where there is uniform color space and can independently set hue, value, and chroma.

8. The color image recording device according to claim 1, wherein the color-adjustment data computation means comprises:

first color conversion means for converting one of XYZ tristimulus values and Yxy values into uniform color space;

second color conversion means for independently converting the selected ranges in accordance with each of the parameters hue, value, and chroma;

third color conversion means for converting from uniform color space to one of XYZ tristimulus values and Yxy values; and fourth color conversion means for converting from one of XYZ tristimulus values and Yxy values into monitor RGB signals, wherein the first color conversion means, the second color conversion means, the third color conversion means, and the fourth color conversion means are operated in consecutive order.

9. The color image recording device according to claim 8, wherein the second color conversion means conducts a conversion only on data which corresponds to the following equation: $360° \geq H1 \geq H \geq H2 \geq 0°$, wherein H1 and H2 are the range of values of the selected hue;

$H = \arctan(b*/a*))$;

$L* = V \times l*$;

$\alpha* = C \times a*$;

$\beta* = C \times b*$;

$A* = \alpha* \times \cos(\Delta H \times \pi/180°) - \beta* \times \sin(\Delta H \times \pi/180°)$;

$B* = \alpha* \times \sin(\Delta H \times \pi/180°) + \beta* \times \cos(\Delta H \times \pi/180°)$;

$\Delta H$ is the hue adjustment value;

V is the value adjustment value; and

C is the chroma adjustment value.

10. The color image recording device according to claim 1, wherein the matrix coefficient computation means finds the matrix coefficient sing a least squares method.

11. The color image recording device according to claim 1, wherein the printing characteristic data recording means, the color adjustment amount setting means, the color adjustment data computation means, and the matrix coefficient computation means, are all integrated into a computer that forms image data.

12. The color image recording device according to claim 1, wherein at least one of the printing characteristic data recording means, the color adjustment amount setting means, the color adjustment data computation means, and the matrix coefficient computation means is integrated into the printer.

13. The color image recording device according to claim 1, wherein the selected color region forms only a portion of an image.

14. The color image recording device according to claim 1, wherein an operator controls the color adjustment setting means.

15. A color recording device that performs printing by inputting RGB image data, the recording device comprising:

print characteristic data recording means for recording print characteristic data of the color image recording device;

color region selection means for selecting a color region;

weighting means for weighting the print characteristic data according to the selected color region; and matrix coefficient computation means for computing a matrix for converting the print characteristic data into data unique to the color image recording device using a setting value established by the color region selection means and the print characteristic data recording means, wherein, the matrix coefficient computation means converts the data using each weighted data item from the print characteristic data recording means.

16. The color image recording device according to claim 15, wherein the color region selection means uses a uniform color space selected from the group of CIELAB and CIELUV.

17. The color image recording device according to claim 15, wherein one of the print characteristic data items stored by the print characteristic data recording means is one of an XYZ tristimulus value and a Yxy value.

18. The color image recording device according to claim 17, wherein another data item is unique to the color image recording device and both data items are stored as one set.

19. The color image recording device according to claim 15, wherein the data unique to the color image recording device are a digital values that correspond one-to-one with gradations on the print paper of yellow, magenta, and cyan.

20. The color image recording device according to claim 15, wherein the color region selection means discriminates one of an XYZ tristimulus value and a Yxy value on a uniform color space and establishes weighted coefficients for each data.

21. The color image recording device of claim 15, wherein the color region selection means automatically recognizes the color region of the RGB image data being input, discriminates a corresponding value on the uniform color space, and establishes the weighting coefficient for each data.

22. The color image recording device according to claim 15, wherein the matrix coefficient algorithm means comprises:

first color conversion means for converting the corresponding values into uniform color spaces;

second color conversion means for converting from weighted coefficients from the color region selection means and the uniform color space to the corresponding values;

third color conversion means for converting from the corresponding values to the monitor RGB, wherein the first, second, and third conversions are executed successively.

23. The color image recording device according to claim 15, wherein the matrix coefficient algorithm computation means computes the matrix coefficient using a method of least squares.

24. The color image recording system according to claim 15, wherein the memory means, the color region selection means, and the matrix coefficient algorithm computation means comprise the computer.

25. The color image recording device according to claim 15, wherein at least one of the print characteristic data memory means, the color region selection means, and the matrix coefficient algorithm comprises a color image recorder.

26. A method for forming color data, on the basis of RGB signals, for printing with a color image recording device, the method comprising:

recording printing characteristics of a printing device with a printing characteristic data recording means;

selecting a color region with a uniform color space;

determining a color adjustment for the selected color region with a color adjustment setting means;

correcting a data value of the printing characteristic data recording means by a setting amount of the color adjustment setting means with a color adjustment data computation means, wherein the color adjustment data computation means conducts data conversion only on the printing characteristic data in the uniform color space; and computing a matrix coefficient in order to convert the RGB signal into data unique to the color image recording device using results of computations of the color adjustment data computation means and the data from the printing characteristic data recording means.

27. The method according to claim 26, wherein the step of selecting a region with the uniform color space comprises selecting one of a CIELAB or CIELUV color representation system.

28. The method according to claim 26, wherein one part of the printing characteristic data is one of XYZ tristimulus values and Yxy values, and additional parts are data unique to the color image recording device.

29. The method according to claim 26, wherein the step of converting the data into data unique to the color image recording device comprises converting the data to at least the three colors yellow, magenta, and cyan.

30. The method according to claim 29, wherein the data unique to the color image recording device further comprise black.

31. The method according to claim 26, wherein the step of converting the data to data unique to the color image recording device comprises converting the data to digital values with a one-to-one correspondence to gradations on four color print paper.

32. The method according to claim 26, further comprising independently setting hue, value, and chroma.

33. The method according to claim 26, wherein the step of correcting a data value comprises:

(1) first converting one of XYZ tristimulus values and Yxy values into uniform color space;

(2) independently converting selected ranges in accordance with each of the parameters hue, value and chroma;

(3) converting from uniform color space to one of XYZ tristimulus values and Yxy values; and (4) converting from one of the XYZ tristimulus values and Yxy values into monitor RGB signals, wherein the first, second, third, and fourth color conversion steps are performed in consecutive order.

34. The method according to claim 33, wherein the second color conversion step conducts a conversion only on data which corresponds to the following equation: $360° \geq H1 \geq H \geq H2 \geq 0°$, wherein H1 and H2 are the range of values of the selected hue;

$H = \arctan(b^*/a^*)$;
$L^* = V \times l^*$;
$\alpha = C \times a^*$;
$\beta = C \times b^*$;
$A^* = \alpha^* \times \cos(\Delta H \times \pi/180°) - \beta^* \times \sin(\Delta H \times \pi/180°)$;
$B^* = \alpha^* \times \sin(\Delta H \times \pi/180°) + \beta^* \times \cos(\Delta H \times \pi/180°)$;

$\Delta H$ is the hue adjustment value;

V is the value adjustment value; and

C is the chroma adjustment value.

35. The method according to claim 33, wherein the step of computing the matrix coefficient comprises using a least squares method.

36. A method that performs printing by inputting RGB image data, the method comprising:

recording print characteristic data of the color image recording device with a print characteristic data recording means;

selecting a color region with a color region selection means;

weighting the print characteristic data according to the selected color region; and computing a matrix for converting the print characteristic data into data unique to the color image recording device using a setting value established by the color region selection means and the print characteristic data recording means with a matrix coefficient computation means; and converting the data using each weighted data item from the print characteristic data recording means.

37. The method according to claim 36, wherein the selecting step comprises selecting a uniform color space selected from the group of CIELAB and CIELUV.

38. The method according to claim 36, comprising storing one of an XYZ tristimulus value and a Yxy value with the print characteristic data recording means.

39. The method according to claim 38, further comprising storing a data item unique to the color image recording device.

40. The method according to claim 39, wherein the data unique to the color image recording device are a digital values that correspond one-to-one with gradations on the print paper of yellow, magenta, and cyan.

41. The method according to claim 36, comprising discriminating one of an XYZ tristimulus value and a Yxy value on a uniform color space and establishing weighted coefficients for the data with the color region selection means.

42. The method according to claim 36, comprising automatically recognizing the color region of the RGB image data being input, discriminating a corresponding value on the uniform color space, and establishing the weighting coefficient for each data with the color region selection means.

43. The method according to claim 36, comprising:

(1) converting the corresponding values into uniform color spaces;

(2) converting from weighted coefficients from the color region selection means and the uniform color space to the corresponding values;

(3) converting from the corresponding values to monitor RGB, wherein the first, second, and third conversions are executed successively.

44. The method according to claim 36, comprising computing the matrix coefficient using a least squares method.

45. A color image recording device that forms color data for printing by adjusting the color of an RGB signal from an input device, the color image recording device comprising:

printing characteristic data recording means for recording printing characteristics of a printing device;

color region selection means for selecting a color region within a uniform color space;

adjustment setting means for determining a color adjustment setting amount in a selected color region having a uniform color space; and matrix coefficient computation means for computing a matrix coefficient in order to convert the RGB signal into data unique to the color image recording device using at least data from the printing characteristic data recording means.

46. The color image recording device according to claim 45, comprising a color adjustment computation means for correcting a data value only of printing characteristic data in the uniform color space, by the setting amount of the color adjustment setting means.

47. The color image recording device according to claim 45, comprising weighting means for weighting the print characteristic data according to the selected color region.

* * * * *